(12) United States Patent
Rajasekhar

(10) Patent No.: US 8,706,717 B2
(45) Date of Patent: Apr. 22, 2014

(54) METHOD AND SYSTEM FOR ENTERPRISE SEARCH NAVIGATION

(75) Inventor: Chitta Rajasekhar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 119 days.

(21) Appl. No.: 12/618,351

(22) Filed: Nov. 13, 2009

(65) Prior Publication Data

US 2011/0119257 A1    May 19, 2011

(51) Int. Cl.
    *G06F 17/30*    (2006.01)

(52) U.S. Cl.
    USPC .......................................... 707/723; 707/746

(58) Field of Classification Search
    USPC ......... 707/3, 713, 627, 706, 9, 722, 752, 734, 707/723
    See application file for complete search history.

(56) References Cited

U.S. PATENT DOCUMENTS

| | | | |
|---|---|---|---|
| 5,982,369 A | 11/1999 | Sciammarella | |
| 6,401,087 B2 * | 6/2002 | Yanagimoto | 1/1 |
| 6,965,899 B1 * | 11/2005 | Subramaniam et al. | 1/1 |
| 6,970,883 B2 * | 11/2005 | Ku et al. | 707/752 |
| 7,047,233 B1 * | 5/2006 | Humphreys et al. | 707/752 |
| 7,254,581 B2 * | 8/2007 | Johnson et al. | 707/627 |
| 7,565,345 B2 * | 7/2009 | Bailey et al. | 1/1 |
| 7,567,957 B2 * | 7/2009 | Ferrari et al. | 1/1 |
| 7,644,065 B2 * | 1/2010 | Wu et al. | 707/999.003 |
| 7,788,322 B2 * | 8/2010 | Busey | 709/203 |
| 7,801,885 B1 * | 9/2010 | Verma | 707/713 |
| 7,801,896 B2 * | 9/2010 | Szabo | 707/739 |
| 7,809,714 B1 * | 10/2010 | Smith | 707/713 |
| 7,885,956 B2 * | 2/2011 | Danish et al. | 707/723 |
| 7,890,499 B1 * | 2/2011 | Boswell | 707/722 |
| 7,966,305 B2 * | 6/2011 | Olsen | 707/706 |
| 7,979,427 B2 * | 7/2011 | McKeeth | 707/723 |
| 8,032,533 B1 * | 10/2011 | Spencer et al. | 707/746 |
| 8,078,632 B1 * | 12/2011 | Stoutamire et al. | 707/759 |
| 8,135,711 B2 * | 3/2012 | Charnock et al. | 707/728 |
| 2002/0055919 A1 * | 5/2002 | Mikheev | 707/3 |
| 2003/0033295 A1 * | 2/2003 | Adler et al. | 707/3 |
| 2004/0088286 A1 * | 5/2004 | Hackleman et al. | 707/3 |
| 2005/0076017 A1 | 4/2005 | Rein | |
| 2005/0278378 A1 * | 12/2005 | Frank | 707/104.1 |
| 2005/0278633 A1 * | 12/2005 | Kemp | 715/713 |
| 2006/0026147 A1 * | 2/2006 | Cone et al. | 707/3 |
| 2006/0190459 A1 | 8/2006 | Wesinger | |

(Continued)

OTHER PUBLICATIONS

Buchta, Stefan, "Secure Enterprise Search Version 10.1.8.4", An Oracle Technical White Paper, Jan. 2009, pp. 1-31.

(Continued)

*Primary Examiner* — James Trujillo
*Assistant Examiner* — Thong Vu
(74) *Attorney, Agent, or Firm* — Campbell Stephenson LLP

(57) ABSTRACT

A method can include receiving a search request from a user interface (UI), selecting one or more repositories in response to the search request, and displaying, on a display device, search results corresponding to the selected repositories. The selected repositories are a subset of a plurality of available repositories, as specified by an administrator. By selecting or de-selecting the available repositories, a user can define or refine a search of the available repositories. In various implementations, the method includes interface elements that assist a user in previewing revised search results based on revised selections of repositories, and/or selections of subcategories of information available in one or more of the repositories.

30 Claims, 7 Drawing Sheets

(56) References Cited

U.S. PATENT DOCUMENTS

| | | | |
|---|---|---|---|
| 2006/0248050 A1* | 11/2006 | Brooks et al. | 707/3 |
| 2007/0055568 A1* | 3/2007 | Osborne | 705/14 |
| 2007/0130207 A1* | 6/2007 | Pate et al. | 707/104.1 |
| 2007/0162450 A1* | 7/2007 | Siress et al. | 707/9 |
| 2007/0219964 A1 | 9/2007 | Cannon | |
| 2007/0282811 A1* | 12/2007 | Musgrove | 707/3 |
| 2007/0288473 A1* | 12/2007 | Mukherjee et al. | 707/10 |
| 2008/0189269 A1* | 8/2008 | Olsen | 707/5 |
| 2008/0243785 A1* | 10/2008 | Stading | 707/3 |
| 2009/0019003 A1* | 1/2009 | Bohannon et al. | 707/3 |
| 2009/0138415 A1* | 5/2009 | Lancaster | 706/11 |
| 2009/0216712 A1* | 8/2009 | Cohen et al. | 707/2 |
| 2010/0057802 A1* | 3/2010 | McKeeth | 707/734 |
| 2012/0278341 A1* | 11/2012 | Ogilvy et al. | 707/749 |

OTHER PUBLICATIONS

Ford, Roger, "Secure Searching With Oracle Enterprise Search", An Oracle White Paper, Mar. 2006, pp. 1-17.
Oracle Secure Enterprise Search Data Sheet, "Secure Enterprise Search Version 10.1.8.4", pp. 1-10.
Krihnamurthy, Vishu, et al., Secure Enterprise Search, One Search Across Your Enterprise Repositories: Comprehensive, Secure, and Easy to Use, Jan. 2007, pp. 1-11.
Cuil Safe Search, Common Ground, p. 1.
Cuil Safe Search, Common Law Marriage, p. 1.
Driver Digital Repository Infrastructure Vision for European Research, hetrogenous network, p. 1.
Driver Digital Repository Infrastructure Vision for European Research, networking, p. 1.
Google Scholar, networking, p. 1.
Google Scholar, Advanced Scholar Search, p. 1.
IEEE Xplore Release 2.5, Advanced Search, p. 1.
IEEE Xplore Release 2.5, Search Results, p. 1.
IEEE Xplore, Release 2.5, Search Results, p. 1.
MicroPatent's PatSearch Full Text Database, p. 1.
Oracle Secure Enterprise Search, http://www.oracle.com/database/secure-enterprise-search.html, (printed on Jul. 14, 2009), pp. 1-2.
IEEE Xplore Release 2.5, http://ieeexplore.ieee.org/search/advsearch.jsp, (printed on May 5, 2009), pp. 1-4.
Cuil Safe Search, Common Law Marriage, http://www.cuil.com/search?m=Common%20Law%20Marriage&q=common, (printed on May 5, 2009), p. 1.
Google Scholar, Advanced Scholar Search, http://scholar.google.co.in/advanced_scholar_search?h1=en&1r=, (printed on May 5, 2009) p. 1.
MicroPatent's PatSearch Full Text Database, http://www.micropat.com/cgi-bin/si/ft/searchform.pl?ticket=649992573668, (printed on May 5, 2009) p. 1.
Driver Digital Repository Infrastructure Vision for European Research, networking, http://search1.driver.research-infrastructures.eu/webInterface/simpleSearch.do?action=load&searchId=124 . . ., (printed on May 5, 2009), pp. 1-3.
Wikipedia, "List of Enterprise Search Vendors," downloaded from http://en.wikipedia.org/wiki/List_of_enterprise_search_vendors (Sep. 9, 2009) pp. 1-2.
Butler, David, et al., "Master Data Management," An Oracle White Paper, Jun. 2009, pp. 1-45.

* cited by examiner

METHOD AND SYSTEM FOR ENTERPRISE SEARCH NAVIGATION

FIELD OF THE INVENTION

The present invention is related to information searches, and particularly relates to displaying and refining searches in an enterprise environment.

BACKGROUND

Searches of extensive data sources often provide many results, which can span multiple screens or pages on the requesting user's display interface. In an attempt to highlight the most relevant results, search tools can use automated algorithms to rank-order the results in a list. Nonetheless, it is not unusual for search results to fail to include the desired target information at the top of this list. If a search returns an extensive list of results, a document desired by a user may actually end up being listed on page 3 or 4 or further down in a multi-page list of search results. The user may altogether miss the desired search result if the list of results is too lengthy to conveniently browse. With existing search tools, users are generally left to their own creativity when the time comes to refine a data search to hone in on the desired results. In addition, the standard approach of deciding on and typing in additional keywords raises a perceptible barrier to users who may be pressed for time. When faced with disappointing search results, users may often give up after one or two attempts to compose and enter revised search terms.

Such failures arise for a variety of reasons. For example, the user may not have carefully selected the search terms. As another example, the user may not be aware of the right search terms that would obtain the desired results. The latter example illustrates a particular problem faced by users: if the users knew exactly what they were looking for, they could rely less on the sophistication of the search engine. It would be helpful to have search tools that can guide a user to better formulate a search request. Similarly, it would be helpful to have search tools that can assist a user to better refine the results that are obtained in their initial searches.

SUMMARY

Described herein are various tools and techniques for supporting data searches in an enterprise environment. The implementations detailed herein can be used in business, educational institutions, government offices, and other enterprises to assist users who seek information from one or more data sources, or other repositories, maintained by or connected with the enterprise.

In one embodiment, a method assists users in formulating search requests by providing options to select among a plurality of administrator-specified repositories. The method also includes receiving a selection of the repositories from the user, receiving a set of search terms from the user, and performing a search of the selected repositories based on the search terms.

In various implementations, the selections and search results are displayed in a graphical user interface (GUI). The GUI provides a combined portal for searching through a variety of administrator-specified repositories. A user can select which of the available repositories should be searched, and can revise these selections with simple interface operations such as mouse clicks. In various situations, the GUI may allow a user to quickly and easily change the selection of repositories after reviewing an initial set of search results. By selecting additional repositories and/or de-selecting previous repositories, a user can quickly tailor an initial search to obtain a revised set of search results.

One reason for repository selection is that the available repositories may store data of different types (e.g., video, music, textual documents, instant messaging data, blog data, and social networking site data). The search results can be displayed in several sections, separated according to the source repositories to which they link and/or according to the types of data, and/or according to other categorizations. The GUI can provide options to the user for selecting one or more types of data to be presented in the search results.

In another embodiment, a system includes a memory configured to store a search index, and a processor coupled to the memory. The processor is configured to display a graphical user interface (GUI) on a display device, receive a search request from the GUI, and select one or more repositories in response to the search request. The selected repositories are a subset of a plurality of administrator-specified repositories displayed on the GUI. The processor is also configured to obtain search results from the search index, and to display the search results on the display device. The search results correspond to the selected repositories.

In various implementations, the system includes an indexing module, a selection module, and a search module. The indexing module is configured to read contents of the plurality of administrator-specified repositories, and to update the search index based at least in part on the contents of the data repositories. The selection module is configured to display selection inputs in the GUI, and to receive selections and de-selections of the administrator-specified repositories. The selection inputs correspond to the plurality of administrator-specified repositories. A search request includes keywords entered by a user, along with the user's selections of the administrator-specified repositories. The search module is configured to generate the search results based on the search index and the search request, excluding results that point to data in the un-selected repositories. The GUI can also enable a user to refine a search to show only results that correspond to one of the selected repositories. Additionally, the GUI can be configured to further refine the search, according to various sub-categories of information. In various situations, these tools may assist a user in composing an initial search request, reviewing the results obtained from a search, and/or revising the search.

BRIEF DESCRIPTION OF THE DRAWINGS

The present invention may be better understood, and its numerous objects, features and advantages made apparent to those skilled in the art, by referencing the accompanying drawings.

DETAILED DESCRIPTION

Figure 1:
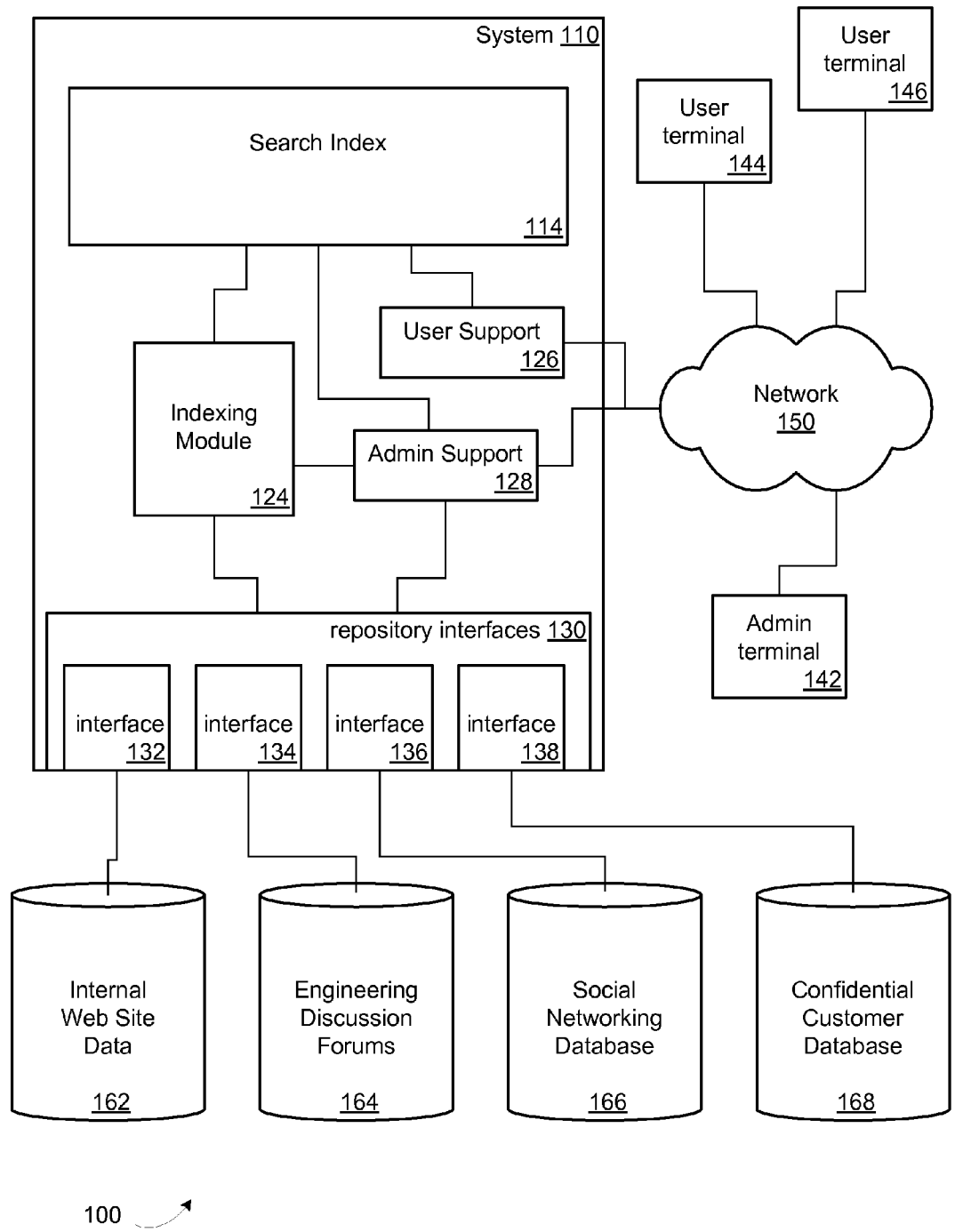
FIG. 1 illustrates an example of an environment in which a data search system can be used to obtain search results from various data repositories in an enterprise.

The large variety of information available from a global search is generally valuable, but it can often be a hindrance.

On one hand, it is helpful for search results to be an exhaustive review of the available information available across an enterprise. On the other hand, a user can be overwhelmed by the large number of results from a global search, only a small fraction of which are likely to be relevant. An alternative is to provide users with a site-specific or repository-specific search. In this approach, each user interface associated with a particular repository is typically customized to assist a user searching for information in that repository. Without a centralized search tool, however, a user may need to repeat a search, formulated in different ways on several different portals, to collect the desired information from several different sources of interest. Thus, wide-reaching global searches and narrow single-source searches each have disadvantages from a user's perspective.

It has been found that the definition and refinement of a search can be enhanced by allowing users to specify the user's desired sources of information. An enterprise may store data in separate data repositories for a variety of reasons, such as the needs of the information-technology staff who implement the repositories. This partitioning can lead, either deliberately or inadvertently, to content groupings. For example, an engineering company's technical training department may develop proprietary videos and store them in an internal web-accessible (intranet) data source. The decision to create this separate intranet site may have been driven by system requirements for storing large quantities of data and for streaming that data at appropriate transmission speeds to users. While this repository may have been defined largely by the data's type (video data), a useful consequence is that the repository ends up being a concentrated source of information with a particular content: a user may recognize that it holds narrative "how to" information for engineers in the company's line of work. Another repository may be defined by the type of software that is used to manage the data, such as Microsoft Exchange Server(R). A user may recognize, however, that this repository is a relevant source of data relating to ongoing conversations. A search for information can therefore benefit by discriminating among repositories, even if the repositories were not initially intended to categorize the data according to content.

Described herein are centralized search tools and techniques that can be used, in various implementations, to obtain relevant search results from user-selected repositories and present them to a user in a combined format. In one embodiment, a search tool enables a user to select among a variety of repositories or other data sources maintained by an enterprise. This search tool enables a user to conveniently restrict a search to the selected data repositories. This selectivity takes advantage of the user's assessment of those repositories most likely to hold the desired data. In one embodiment, the search tool further enables the user to easily revise repository selections while reviewing the search results. The ability to specify and quickly revise searches based on selected repositories can also be extended to selected data types associated with repositories, and other criteria. In one embodiment, a search tool assists a user with the winnowing of search results, guiding the user's efforts to "drill down" into narrower search results based on selected repositories, the types of available data, and other factors.

FIG. 1 illustrates an example of an environment 100 in which a data search system 110 can be used to obtain search results from various data repositories in an enterprise. Data search system 110 is accessible by users and administrators from terminals 142, 144, and 146 through a network 150 such as a local area network (LAN) or a wide area network (WAN) such as the Internet. Data search system 110 is also coupled to available repositories, which include, for example, an internal web site data repository 162, an engineering discussion forum data repository 164, a social networking data repository 166, and a confidential customer data repository 168.

Data search system 110 includes a search index 114 that is coupled to an indexing module 124, a user support module 126, and an administrator support module 128. Administrator support module 128 is coupled to indexing module 124, and to a set of repository interfaces 132, 134, 136, and 138 (collectively, repository interfaces 130). Support modules 126 and 128 also interface with network 150.

The various repositories 162, 164, 166, and 168 are coupled to data search system 110 by a system administrator(s) who installs or configures the appropriate interfaces 132, 134, 136, and 138, respectively, for the repositories. Interfaces for the repositories can be in the form of, for example, an application programming interface (API). Repository interfaces 130 provide indexing module 124 with communication links to the data repositories. Indexing module 124 communicates with repository interfaces 130 using protocols that are agnostic with regard to the types of the repositories.

Various types of data can be found in repositories such as repositories 162, 164, 166, and 168. Depending on the needs of an enterprise, the repositories can hold data such as collections of spreadsheets, presentations, portable documents, blueprints, word-processing files, and other electronic documents; databases; email collections, Short Message Service/Silent Messaging Service (SMS) logs, Multimedia Messaging Service (MMS) logs, and other communications archives; collections of digitized photographs, audio recordings, video files, and other multimedia files; web sites, web logs ("blogs"), discussion forums, wikis, community sites within an organization, and other collections of social-network data; collections of desktop widgets, internet widgets, and other tools that can be used to collect and store data; and other types of reposited data, such as mashups, tag clouds, podcasts, and syndicated feeds, among others. A variety of interfaces can be used to access these data, such as file systems, web-browser portals, and application programming interfaces.

For example, the enterprise's internal web site data can be stored and/or archived in repository 162. The corresponding repository interface 132 includes appropriate tools for reading and interacting with the intranet web data, and indexing module 124 can use these tools to examine contents of repository 162. This examination can be used to populate and update search index entries in search index 114.

Interfaces 132, 134, 136, and 138 can include appropriate modules for interacting with various types of storage hardware, and with various storage-device operating systems, file systems, virtual storage interfaces, and other relevant storage protocols. Interfaces 132, 134, 136, and 138 can also include appropriate modules for reading the stored data, such as web crawlers and parsing tools. For example, if one or more of the repositories includes a database managed by Microsoft Exchange Server, the corresponding repository interface may interact with the Exchange Server though a Messaging Application Programming Interface (MAPI) module. Alternatively, the repository interface may include a module that directly reads data from the Exchange database.

Figure 2:
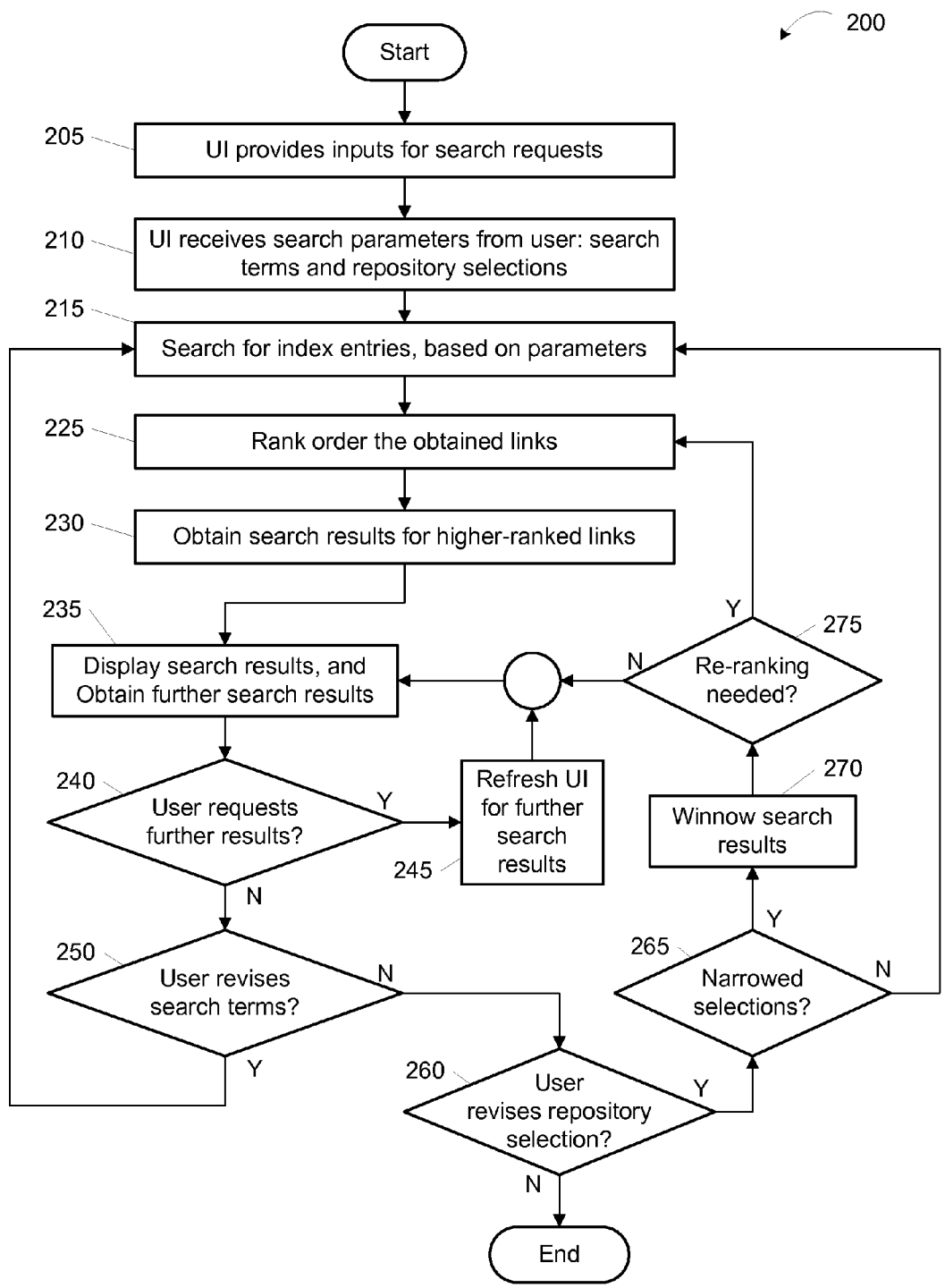
FIG. 2 is a flow diagram of one embodiment of a data search procedure.

FIG. 2 is a flow diagram of one embodiment of a data search procedure 200. The procedure provides for displaying initial results, with rankings by relevance, and for modifying those results through selective inclusion and exclusion of data sources. In one embodiment, display of user input elements and results of the search are performed through a graphical user interface (GUI). Such a graphical user interface can be displayed using hypertext markup language (HTML)-type pages and/or Java-based scripts, for example. Embodiments of the present invention are not, however, restricted to the use of such HTML or Java-based mechanisms. Fore example, display and input entry can alternatively be performed using a command-line interface, or a customized application executing on a user node (e.g., terminals 144, 146).

Data search procedure 200 commences by providing GUI input elements in which a user can enter parameters for a search request (205). The input elements can include, for example, text-entry blocks, radio buttons, check boxes, and other data-entry widgets.

The user interface can include selective indicators (e.g., button input elements) for the repositories that are available for searching. Input elements can also enable the user to enter desired search terms in textual format. In other embodiments, the search terms or other criteria can be entered non-textually. For example, a user can select text boxes describing the content of a desired video clip, or a point(s) on a color wheel describing a color in a desired photograph. Through the various input elements, the user interface receives a search request from a user (210).

Once the search parameters are provided, the procedure examines a search index (e.g. search index 114) based on the search parameters (215). This examination identifies entries in the search index that refer to data which is relevant based on the user's search terms and the user's selections of the desired repositories. The search index is updated on an ongoing basis by tools that examine the data in the various available data repositories (e.g. indexing module 124). Each entry in the search index indicates the associated source repository and includes a link to the corresponding data in the source repository. The search index can be made according to a variety of algorithms, such as sorting, page-ranking, or entry-ranking algorithms that can enable the examination 215 to provide fast and relevant search results.

The identified index entries can be rank ordered according to relevance for the search (225). Index entries that are most likely to link to data desired by the user can be included at the top of the ordering. The ordering continues according to decreasing relevance. Such selections and rankings of search results can be provided through the use of appropriate ranking algorithms, such as ranking procedures used to generate the search index, and/or procedures that consider other ranking factors, such as temporal considerations (e.g., a "recent results" request by a user), age or linguistic considerations (e.g., the language used by a particular user or the age of the user), geographical considerations, and/or jurisdictional considerations (e.g., the location of the user and/or legal restrictions on the use of content in that location). In various implementations of the procedure, the examination of the search index can be augmented by an examination of the selected repositories.

Data search procedure 200 can also obtain search results, which briefly describe the linked data, for a set of the highest-ranked index entries (230). The search results can include previews, such as text snippets or graphic thumbnails, of the data that are referenced by these links. If the search index includes these snippets or thumbnails, then the preview information can be obtained from the search index itself. Alternatively, or in addition, the snippets or thumbnails can be obtained or augmented by data retrieved from the corresponding repositories. The search results also include links to the data to which they refer (e.g., text addresses and/or clickable hypertext links). The search results are displayed for the user (235). Additional lower-ranked links and corresponding preview information can be concurrently retrieved from the search index and/or from the repositories.

The user can then be given an opportunity to decide how to proceed in light of the displayed set of highest-ranked results. For example, at any subsequent point in the procedure, the user may elect to examine the actual data indicated by one of the displayed search results. The user can also indicate whether a set of the next-highest ranked search results is desired (240). This indication can be provided thorough appropriate input elements (e.g., a "Next Page" button). If the user requests those additional search results, then the display is refreshed in preparation for showing the next set of search results (245). This next set of search results may have been obtained while the previous results were being displayed (e.g., during block 235 as discussed above). These lower-ranked search results can then be displayed (by returning to block 235).

If the user does not wish to view the lower-ranked search results, then the user can indicate whether to revise the search terms (250). This indication can be provided though appropriate input elements, such as by re-presenting one or more of the search term entry interfaces to the user along with the search results. If the user enters new search terms, then a new search is performed based on those terms (215).

If the user does not enter new search terms, then the user can indicate whether to revise the existing search with a different selection of the repositories (260). This determination can be made though appropriate input elements, such as by re-presenting the user with input elements that allow the user to select or de-select from the available repositories. If the user does not desire any revisions to the search, then data search procedure 200 terminates (or stands by and awaits a selection of one of the displayed search results). If the user makes a revised selection of repositories, then a revision of the existing search is initiated based on the revised selection.

In various implementations of the procedure, this revision of the search can include a determination of whether the revised repository selection is narrower than the selections from the previous search (265). That is, the procedure determines whether the new selection includes only a subset of the repositories that were selected in the previous search. If the new selection includes one or more repositories other than the repositories from the previous search (i.e., the revised search is not for a subset of the previously selected repositories), then a new search of the search index is initiated (215).

On the other hand, if the revised repository selection is narrower than the selections from the previous search, then the already-obtained search results can be used without initiating a new examination of the search index. The existing search results can be winnowed to obtain the narrower set of search results (270).

A determination is then made as to whether the winnowed search results need to be re-ranked (275). This determination depends on whether the revised repository selection impacts the ranking of the search results. In most situations, a narrowed-repository search does not need to be re-ranked; once entries from the de-selected repositories are removed, the remaining entries are already sorted in the appropriate order.

In some situations, however, a re-ranking of search results may be appropriate. For example, various implementations of a search index can include several contributing factors to the weighting of each entry, depending on which other repositories are considered when generating the weightings. For example, ranking algorithms can assign weights to a data entry based on "votes" from other data entries that point to that data entry. In various implementations of a ranking system, if an entire repository of data entries is excluded from a search, then the ranking can be altered to reflect the revised weightings that arise from the exclusion of those votes. Other factors regarding the construction of the search index and the ranking algorithms may also necessitate a re-ranking of search results.

If a re-ranking is appropriate, then the winnowed search results are re-ranked (225). Otherwise, the highest-ranked winnowed search results are displayed (235).

Figure 3:
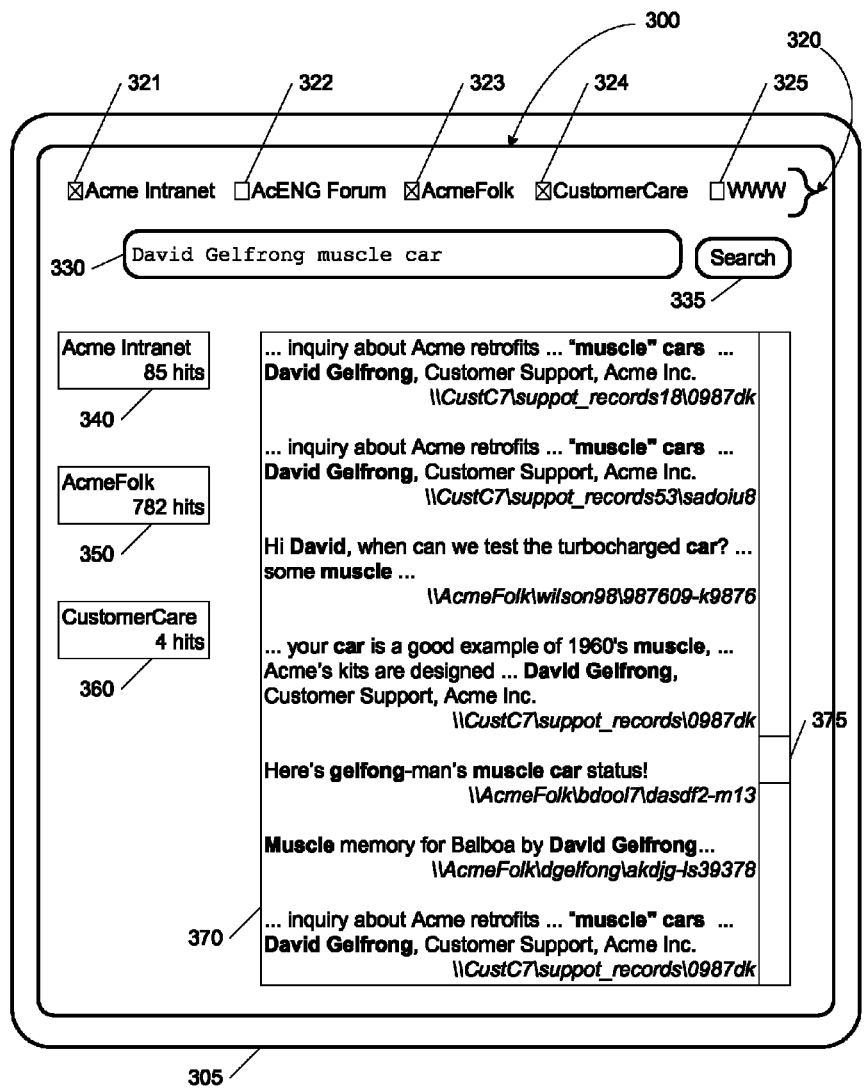
FIGS. 3-5 illustrate examples of user interface displays configured for use in a data search.
Figure 4:
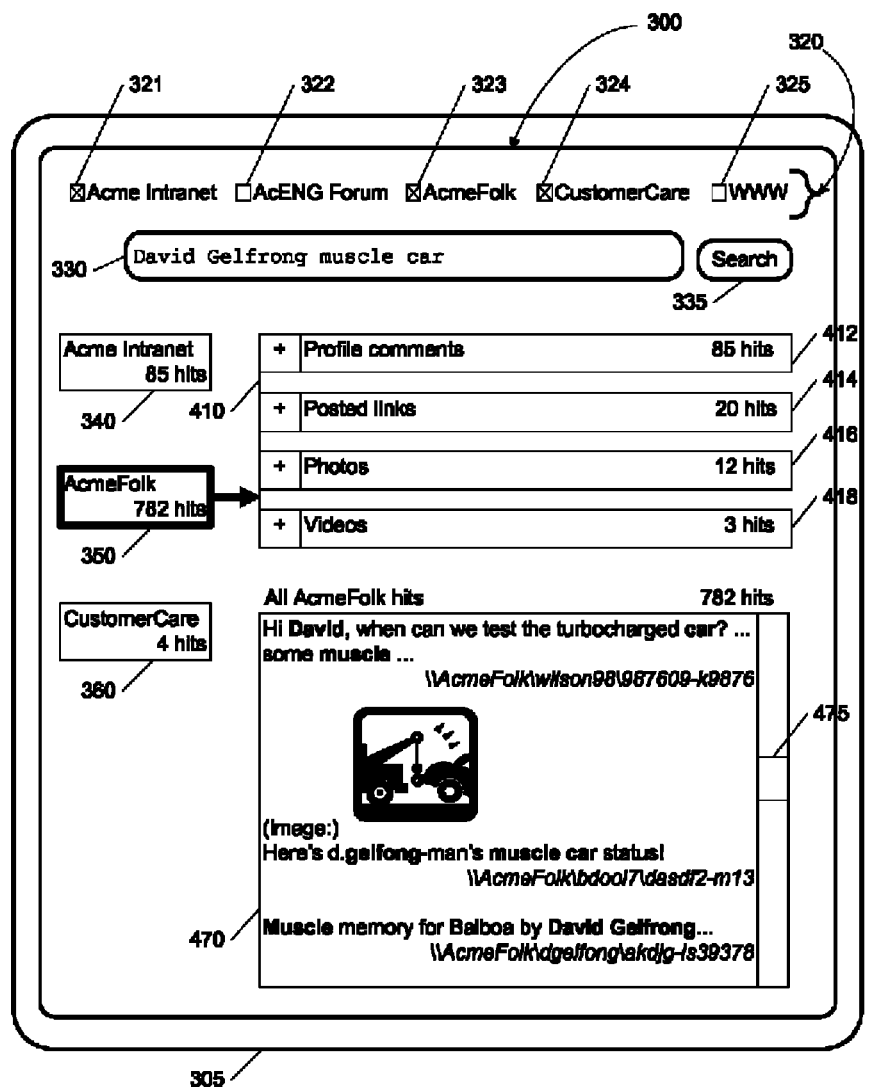
Figure 5:
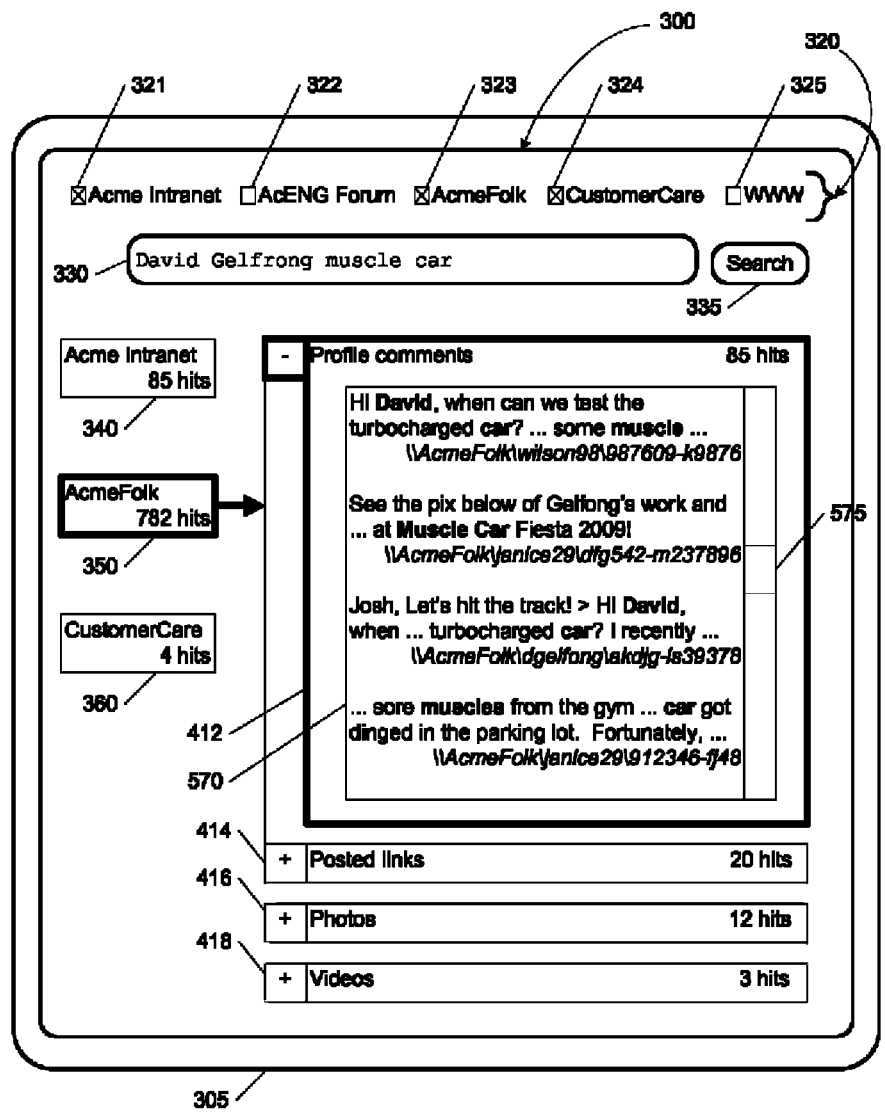

FIGS. 3-5 illustrate examples of user interface displays configured for use in a data search. FIG. 3 depicts an interface 300 as displayed on suitable physical hardware, such as a computer monitor 305 coupled to a user-accessible node (e.g., user terminal 144). Interface 300 displays input elements for entering parameters of a user's query. These input elements include, for example, check boxes 320, text box 330, and a button 335. The user can enter desired search terms or keywords into text box 330. By checking or un-checking the repository-associated check boxes 320, the user can select desired data repositories to be included in the search. As illustrated, the administrator-enabled check boxes are associated with an internal corporate web site 321 ("Acme Intranet"), a technical discussion forum 322 ("AcENG Forum"), a social networking site 323 ("AcmeFolk"), and a customer support database 324 ("CustomerCare"). In addition to these enterprise repositories, the illustrated example also provides an option to obtain search results through an internal or external search engine for external sites such as interne web pages 325 ("WWW").

A search is performed using the entered parameters when the user clicks button 335 ("Search"). In the depicted example, a user has requested a search using the terms "David Gelfrong muscle car." As shown by check boxes 320, this search request specifies three repositories: the internal corporate web site, the social networking site, and the customer support database. The search results obtained for these three selected repositories are shown in output pane 370. The displayed results do not include search results that link to data in the non-selected repositories.

The search results can be obtained from an examination of an already-assembled search index (e.g., search index 114). Alternatively, or in combination, all or a portion of the search results can be obtained from an examination of the selected repositories. In the depicted example, each search result includes a snippet and/or a thumbnail of the linked data, boldface type for words that match the user's search terms, and an address of the linked data. The addresses can be, for example, file paths, uniform resource locators (URLs), locations within a file or database, or other types of addresses, or combinations thereof. The search results can be hyperlinked to corresponding entries in the selected repositories. For example, if a user clicks on or otherwise selects a particular search result, the corresponding data from within a repository can be displayed in a new window or tab.

As illustrated, search results may exceed a viewing area that is available in output pane 370. Various tools can be used to assist the user in locating the desired search results among those that have been obtained. For example, a scroll bar 375 can be provided to allow scrolling through the rank-ordered search results. As another example, the search results can be sorted in a hierarchical fashion, grouped according to the repositories.

Repository buttons 340, 350, and 360 illustrate such a technique of associating result entries with repositories to assist users in locating the desired search results. In FIG. 3, repository buttons 340, 350, and 360 are displayed in response to a search request, alongside output pane 370. The repository buttons correspond to the selected repositories of the search request. Each of the repository buttons serves both as an output element and as an input element. As an output element, button 340 indicates that among the results in pane 370, 85 search results ("hits") are associated with the internal corporate web site. That is, these search results refer to 85 instances of data that were found in the Acme Intranet repository. Similarly, repository button 350 indicates that 782 of the search results are associated with the AcmeFolk social networking site. Repository button 360 indicates that four of the search results are associated with the CustomerCare support database.

As input elements, repository buttons 340, 350, and 360 allow a user to conveniently refine the display of search results by clicking on one of the buttons. If a user clicks on a repository button, the interface is revised to focus on a category of search results from only that repository. This operation assists a user to drill down to a deeper set of narrowed search results. For example, if the user clicks on button 360, then the initial output pane 370 is replaced with revised information corresponding only to the results that link to information in the CustomerCare support database.

Along with check boxes 320, repository buttons 340, 350, and 360 enable a user to deliberately select or de-select collections of data at any time in the search/review process. As discussed above, even if these collections are created and partitioned by criteria other than content, a user can recognize that some collections may have more-relevant or less-relevant information content for a particular search. In the context of a particular search, the various administrator-specified repositories can serve as a useful categorization of the search results. The depicted examples enable a user to employ this recognition to the user's benefit.

The ability to select among repositories can be especially helpful in an enterprise environment. For example, a user may initiate a search by requesting search results associated with several of the enterprise's repositories. After reviewing the initial search results, the user may decide to quickly narrow the search, drilling down into a social network repository (e.g., "AcmeFolk") for some searches, or into corporate intranet pages (e.g., "Acme Intranet") for others. As discussed below, buttons 340, 350, and 360 can be used to simplify this operation. In contrast to environments that require a user to repeat a search through several different portals for each of several different repositories, interface 300 can provide simplified and faster searches.

FIG. 4 illustrates an example of a revised display of a user interface, subsequent to the selection of a repository. This example shows interface 300 after a user has selected button 350 for a display of winnowed results for a particular category: search results associated with a social networking site. In this revised display, the initial output pane 370 has been replaced with a sub-category tree 410 and a revised output pane 470. Output pane 470 presents only search results that are associated with the selected repository. Thus, by making a relatively quick input operation (e.g., a single mouse click), the user can narrow an initial set of search results to a particular subset of search results that corresponds to data from a specified repository. A scroll bar 475 can be provided to allow scrolling through the search results in output pane 470. In the depicted example, the displayed category of results corresponds to the selected repository, "AcmeFolk." By clicking on the other repository buttons 340 or 360, the user can switch to narrowed search results for the other categories/repositories "Acme Intranet" or "CustomerCare."

Sub-category tree 410 assists a user in further winnowing the search results. For example, the depicted sub-category tree includes four buttons for corresponding sub-categories: "Profile comments" 412, "Posted links" 414, "Photos" 416, and "Videos" 418. By clicking on one of these buttons, a user can obtain a further-narrowed set of search results. In this example, clicking on sub-category button 418 would narrow the search results to show only those results which both point to the "AcmeFolk" repository, and which include video content.

FIG. 5 illustrates an example of a sub-category display provided by embodiments of the present invention. In this example, interface 300 has been revised after a user has selected the "Profile comments" button 412 from FIG. 4. In FIG. 5, sub-category tree 410 and revised output pane 470 have been removed from interface 300, and a sub-category pane 570 is displayed. Sub-category pane 570 displays only those results that both point to the "AcmeFolk" repository and include profile comments. The search results in sub-category pane 570 are a subset of the search results from revised output pane 470, and are in the same order. Depending on the techniques used to order these results, the search results in sub-category pane 570 may be a subset of the search results from revised output pane 470, but in a revised order. A scroll bar 575 can be provided to allow scrolling through the search results in output pane 570.

Various types of sub-categories can be provided to assist a user in narrowing the search results. In the examples shown in FIGS. 4 and 5, one level of sub-categories is provided. The sub-categories correspond to types of content (profile comments, posted links, photos, videos) that appear in a social network repository. These categories can be configured by an administrator when the search tool is initially connected to the repository. The administrator may tailor the sub-categories according to the expected types of content in each repository. Alternatively, the administrator or a user may choose a single set of sub-categories for the entire collection of repositories (e.g., chronological sub-categories that divide the content according to creation dates or modification dates). If a ranking algorithm and/or administrator settings are used to generate sub-categories, then these automated sub-categories can assist users to at least partially refine their searches without entering any additional search terms or keywords. Moreover, multiple levels of sub-categories can also be provided to further assist users to refine their searches.

Figure 6:
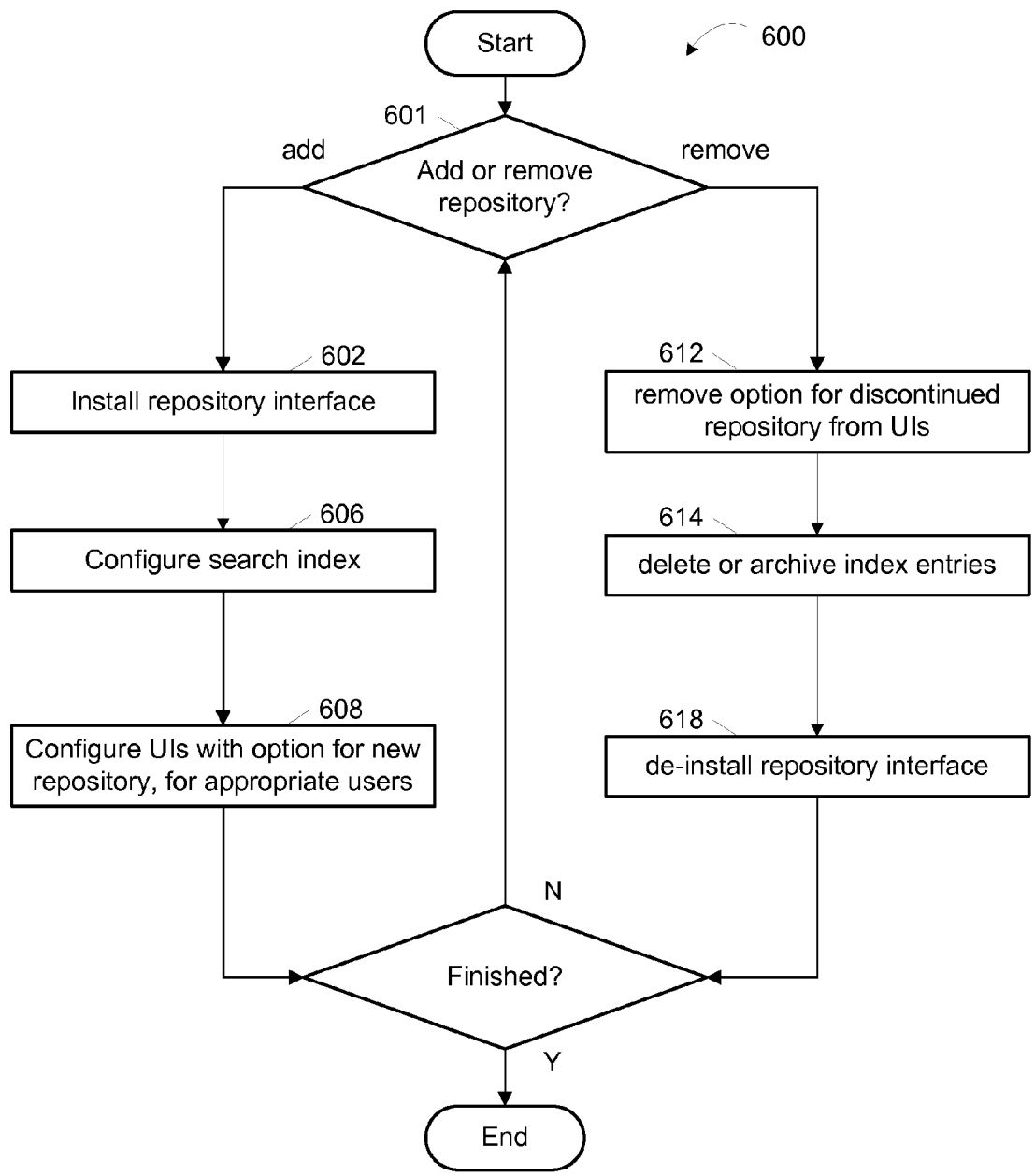
FIG. 6 is a flow diagram of an example of an administrative procedure for installing and removing repositories to and from a data search system.

FIG. 6 is a flow diagram of an example of an administrative procedure for installing and removing repositories to and from a data search system. An administrative procedure 600 can be implemented, for example, by administrator support module 128 to connect or remove repositories 162, 164, 166, and 168 with or from data search system 110.

Administrative procedure 600 commences by determining whether an existing repository needs to be disconnected (removed) or whether an additional repository is desired to be installed (added) (601). This determination can be based on an administrator input. For example, a system administrator may enter an instruction through administrator terminal 142 for the addition of the additional repository. If an additional repository is to be installed, then a corresponding repository interface (e.g., interface 138) can be installed (602). The corresponding repository interface includes appropriate modules for communicating with the additional repository (e.g., reading and writing data to the repository). If the added repository includes linked entries (such as intranet pages or other hypertext material), then the repository interface can include appropriate spider or crawler modules for spanning the data in the repository. The system that executes administrative procedure 600 can also configure and update a search index (e.g. search index 114) to accommodate and include an indexed description of the data in the added repository (606).

The system that executes administrative procedure 600 can also configure user interfaces so that they indicate the presence of the additional repository, and so that a user can select or de-select the additional repository when requesting a search for information (608). An administrator configures the user interfaces to provide an added input element (e.g., another check box 320) for the additional repository. The acts 602, 606, and 608 include a combination of manual and automated operations. In other implementations, these acts can be performed under fully automatic control, or under manual guidance and programming by an administrator(s). After installing the additional repository, administrative procedure 600 can terminate, or can repeat if any further administration is needed (601).

If a repository is to be removed (601), then user interfaces are updated to remove the option for selecting the now-discontinued repository (612) and the index entries for the discontinued repository are deleted or disabled from the search index (614). These index entries can optionally be archived for historical analysis, or in anticipation that the repository may be returned to service at some point in the future. The corresponding repository interface can be removed or disabled (618). The acts 612, 614, and 618 can be performed under automatic or manual control, or some combination thereof. Administrative procedure 600 then terminates, or repeats if any further administration is needed (601).

Figure 7:
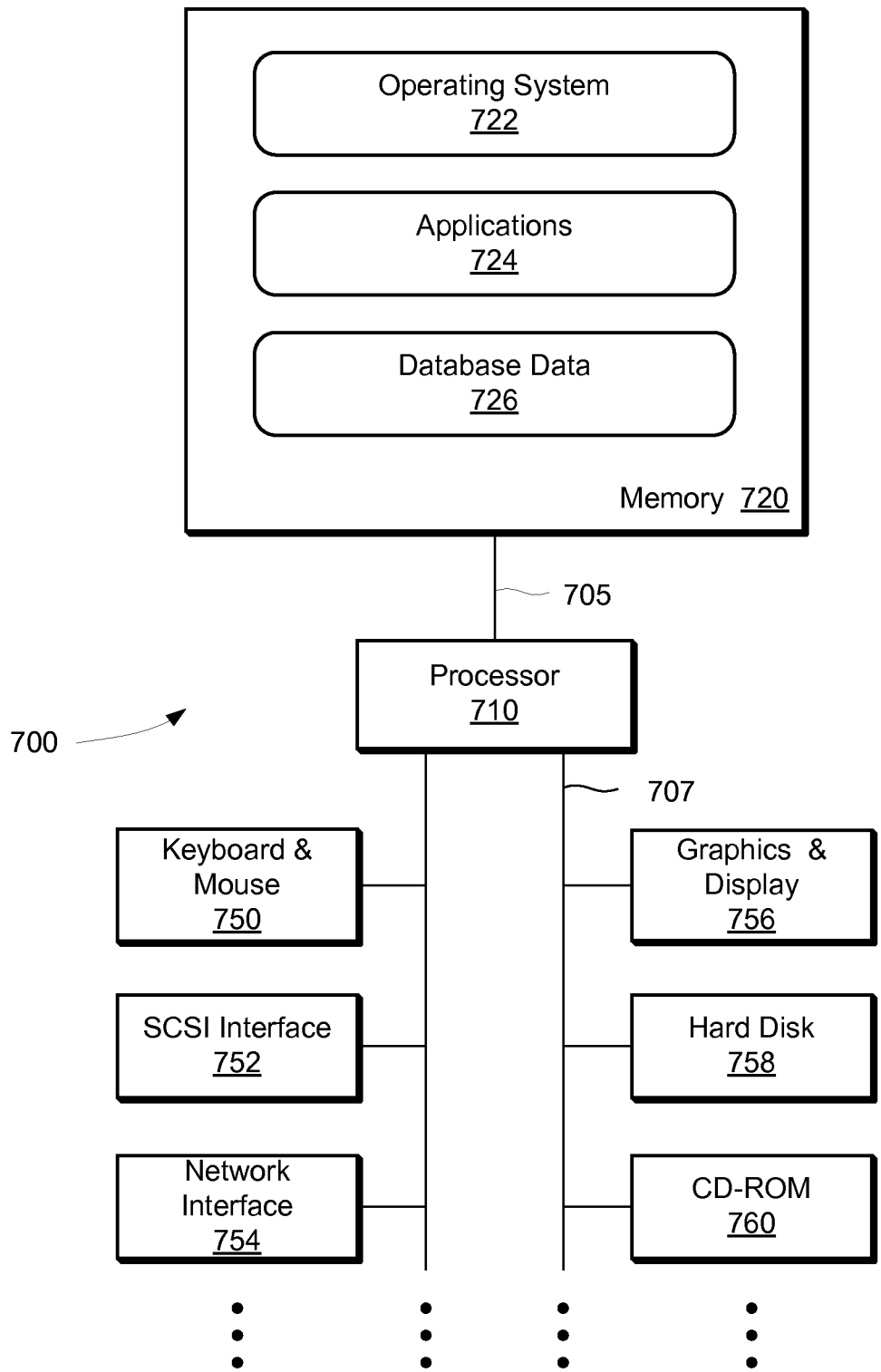
FIG. 7 illustrates an example of a computer system usable in various implementations of the data search system.

FIG. 7 illustrates an example of a computer system 700 that can be used in various implementations of a data search system. For example, the computer system 700, or portions thereof, can be used to implement a system (e.g., data search system 110) that runs applications for communicating with data repositories, generating and maintaining a search index for the data repositories, performing searches of data available in the repositories, and providing user interfaces for data searches. Computer system 700 can include one or more processors 710 and memories 720 coupled together by a communications bus 705. Processor 710 can be a single processor or a number of individual processors working together. It is also contemplated that processor 710 can be one or more virtual processors usable with interpreted languages. Memory 720 can be a random access memory (RAM) or some other dynamic storage device and can be capable of storing instructions to be executed by the processor, e.g., an operating system 722 and applications 724, as well as database data 726. Operating system 722 can include software for implementing a file system, managing network communications and repository interfaces, managing user preferences, or combinations thereof, among others. Memory 720 can be augmented to include auxiliary storage such as a Single Inline Memory Module (SIMM) card, a flash memory, optical drives, and/or a hard disk, and can also be used for storing temporary variables or other intermediate information during the execution of instructions by processor 710.

Computer system 700 can also include devices such as a keyboard and mouse 750, other human-interface input devices, a SCSI interface 752, one or more network interfaces 754 supporting wired and/or wireless communications, a graphics module and display 756, other human-interface output devices, a hard disk 758, and a CD-ROM 760, all of which are coupled to processor 710 by a communications bus 707. It will be apparent to those having ordinary skill in the art that computer system 700 can also include numerous elements not shown in the figure, such as additional storage devices, communications devices, input devices and output devices, as illustrated by the ellipses shown.

FIGS. 1-6 illustrate some of the many operational examples of the techniques of the present invention. Those having ordinary skill in the art will readily recognize that certain steps or operations described herein can be eliminated or taken in an alternate order. Moreover, various operations discussed with respect to FIGS. 1-6 can be implemented as one or more software programs for a computer system, and can be encoded in a communicated signal and/or encoded in a computer readable storage medium. For example, software 722 or 724 can be stored as source code (e.g., in languages such as assembly language, Pascal, and C; object oriented languages such as C++, C#, and Java; and scripting languages such as Perl and Tcl/Tk) or compiled or interpreted instructions executable on one or more processors. The computer readable storage medium can include a solid-state storage medium, a magnetic storage medium (e.g., hard disk 758), or an optical storage medium (e.g., CD-ROM 760), or combinations thereof. Separate instances of these programs may be executed on separate computer systems. Thus, although certain steps have been described as being performed by certain devices, software programs, processes, or entities, this need not be the case and a variety of alternative implementations will be understood by those having ordinary skill in the art. Additionally, those having ordinary skill in the art will readily recognize that the techniques described above can be utilized with a variety of different storage devices and computing systems with variations in, for example, the number of processors, host systems, storage systems, or applications, among others.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a search request via a user interface (UI), wherein
      the search request comprises one or more search terms,
      the search request specifies a set of repositories,
      the search request is a request to perform a search on the set of repositories,
      the set of repositories is a subset of a plurality of repositories,
      each repository of the set of repositories represents a corresponding type of content of a plurality of types of content,
      each of the plurality of types of content is in a corresponding of a plurality of formats,
      the UI is configured to initiate the search using the one or more search terms by communicating the one or more search terms to a search index coupled to the set of repositories via a plurality of repository interfaces, and
      the search index is coupled to the each repository by a corresponding repository interface of a plurality of repository interfaces; and
   receiving a plurality of individual search results from the set of repositories at a set of the plurality of repository interfaces, wherein
      the plurality of individual search results comprise the plurality of types of content; and
   displaying, on a display device, search results corresponding to the plurality of individual search results, wherein
      the search is performed on the set of repositories, and
      the search results are configured to be displayed by virtue of being in a single format.

2. The method of claim 1, wherein
   the UI comprises a plurality of repository selection inputs;
   the plurality of repository selection inputs corresponds to the plurality of repositories;
   the search request comprises
      a selection of a first repository selection input of the plurality of repository selection inputs; and
   the revised repository request comprises
      a de-selection of the first repository selection input of the plurality of repository selection inputs.

3. The method of claim 2, wherein
   the selection of the first repository selection input corresponds to a first repository,
   the search results comprise first search results corresponding to the first repository,
   the revised repository request is configured to return revised search results,
   the revised search results correspond to the revised set of repositories, and
   the revised search results exclude the first search results corresponding to the first repository.

4. The method of claim 3, further comprising:
   displaying the UI on the display device;
   displaying the search results in the UI; and
   displaying the plurality of repository selection inputs in the UI, wherein
      the displaying the search results further comprises revising the UI to display the revised search results.

5. The method of claim 3, further comprising:
   receiving indications of the plurality of repositories.

6. The method of claim 5, wherein
   the search request comprises the indications,
   the indications correspond to user selections and user de-selections of the plurality of repository selection inputs, and
   the set of repositories are selected in response to the indications.

7. The method of claim 5, further comprising:
   generating a search index of the plurality of repositories, wherein
      the generating the search index is performed in response to the receiving
         the indications of the plurality of repositories, and
      the generating the search index comprises
         communicating with each of the plurality of repositories.

8. The method of claim 7, wherein
   the receiving the indications of the plurality of repositories is performed during a configuration of the search index, and
   the plurality of repositories are configured to be specified by an administrator.

9. The method of claim 5, further comprising:
   receiving an update of the indications of the plurality of repositories; and
   selecting the revised set of repositories in response to the update.

10. The method of claim 5, further comprising:
   configuring data interfaces in response to the receiving indications of the plurality of repositories, wherein the data interfaces are configured to provide communication with the plurality of repositories; and
   configuring the UI in response to the receiving indications of the plurality of repositories.

11. The method of claim 1, further comprising:
selecting the set of repositories, wherein
the set of repositories is selected in response to the search request; and
obtaining the search results from a search index, wherein
the set of repositories is used as search parameters, and
the search results are ranked.

12. The method of claim 11, further comprising:
re-ranking the search results, in response to the revised repository request,
wherein
the re-ranking generates, at least in part, the revised search results.

13. The method of claim 1, wherein
the UI comprises
a first section displaying search results corresponding to a first repository of the set of repositories, and
a second section displaying search results corresponding to a second repository of the set of repositories,
the first and second sections are displayed in a single-page view, and
the first section comprises
a check box for a first repository selection input corresponding to the first repository,
a rank-ordered list of the search results corresponding to the first repository,
a count describing a number of search results corresponding to the first repository, and
a hierarchy of check boxes for selection of categories and subcategories of data from the first repository.

14. The method of claim 1, wherein
the set of repositories comprises repositories of different types, and
the set of repositories are each of a type selected from a group comprising
a training archive,
an instant messaging archive,
a blog archive, and
a video archive.

15. The method of claim 1, further comprising:
in response to a determination that the revised set of repositories is a subset of the set of repositories,
narrowing the search results to the revised search results, wherein
the revised search results are a subset of the search results.

16. The method of claim 1, further comprising:
in response to a determination that the revised set of repositories is not a subset of the set of repositories, obtaining new search results corresponding to the revised set.

17. The method of claim 1, wherein
the selected repository is a repository of the plurality of repositories that is not in the subset of the plurality of repositories, and
the de-selected repository is a repository of the plurality of repositories in the subset of the plurality of repositories.

18. The method of claim 1, wherein the revised set of repositories further differs from the set of repositories by virtue of
exclusion of a de-selected repository from the revised set of repositories, wherein
the de-selected repository is included in the set of repositories.

19. The method of claim 1, wherein
the one or more search terms comprise non-textual criteria, and
the non-textual criteria describes content of at least one of a photograph and video.

20. The method of claim 1, further comprising:
ranking revised search results, wherein
the revised search returns the revised search results,
the revised search results are ranked using ranking factors, and
the ranking factors comprise at least one of
temporal considerations, age considerations, linguistic considerations, geographic considerations, or jurisdictional considerations.

21. The method of claim 1, further comprising:
receiving a first indication for first narrowed search results, wherein
the first indication is associated with a first repository of the set of repositories, and
the first narrowed search results comprise a first subset of the search results that corresponds to the first repository.

22. The method of claim 21, further comprising:
displaying the first narrowed search results in a display;
receiving a second indication for second narrowed search results, wherein
the second indication is associated with a second repository of the set of repositories, and
the second narrowed search results comprise a second subset of the search results that corresponds to the second repository; and
switching the display from the first narrowed search results to the second narrowed search results.

23. The method of claim 1, further comprising:
receiving a revised repository request via the UI, wherein
the revised repository request specifies a revised set of repositories,
the revised repository request is a request to perform a revised search using the revised set of repositories, and
the revised set of repositories differs from the set of repositories by virtue of
inclusion of a selected repository in the revised set of repositories, wherein the selected repository is not included in the set of repositories; and
performing the revised search on the revised set of repositories using the one or more search terms.

24. The method of claim 1, wherein
each repository of the set of repositories represents a corresponding set of storage devices of a plurality of storage devices, and
each corresponding set of storage devices stores a corresponding type of content of a plurality of types of content.

25. The method of claim 24 wherein the search index is coupled to the each corresponding set of storage devices by the corresponding repository interface.

26. The method of claim 24 wherein each corresponding set of storage devices is configured to store searchable data of one of the plurality of types of content.

27. A system comprising:
a processor;
a computer-readable storage medium, coupled to the processor and configured to store a search index; and
a plurality of instructions, wherein
the instructions are encoded in the computer-readable storage medium,
the instructions are configured to cause the processor to
display a user interface (UI) on a display device,
receive a search request via the UI, wherein the search request comprises one or more search terms, the search request specifies a set of repositories, the search request is a request to perform a search on a set of repositories, the set of repositories is a subset of a plurality of plurality of repositories, each repository of the set of repositories represents a corresponding type of content of a plurality of types of content, each of the plurality of types of content is in a corresponding of a plurality of formats, the UI is configured to initiate the search using the one or more search terms by communicating the one or more search terms to a search index coupled to the set of repositories via a plurality of repository interfaces, and the search index is coupled to the each repository by a corresponding repository interface of a plurality of repository interfaces; and receive a plurality of individual search results from the set of repositories at a set of the plurality of repository interfaces, wherein the plurality of individual search results comprise the plurality of types of content; and display, on a display device, search results corresponding to the search, wherein the search is performed on the set of repositories, and the search results are configured to be displayed in a combined format.

28. The system of claim 27, further comprising:

an indexing module, wherein the plurality of repositories are configured to be specified by an administrator, the revised set of repositories is configured to be used to revise the search, the revised repository request is configured to return revised search results, the revised search results correspond to the revised set of repositories, the indexing module is coupled to the processor and the computer-readable storage medium, and the indexing module is configured to read contents of the plurality of repositories, and update the search index, based at least in part on the contents of the plurality of repositories;

a selection module configured to display selection inputs in the UI, wherein the selection inputs correspond to the plurality of repositories, and receive selections and de-selections of the plurality of repositories, wherein the search request comprises the selections and de-selections of the plurality of repositories; and a search module configured to generate the search results, based at least in part on the search index and the search request, and exclude data from the search results, based at least in part on the de-selections of the plurality of repositories.

29. A computer program product, comprising:

a plurality of instructions, comprising a first set of instructions, executable on a computer system, configured to receive a search request via a user interface (UI), wherein the UI is configured to be displayed on a display of the computer system, the search request comprises one or more search terms, the search request specifies a set of repositories, the search request is a request to perform a search on a set of repositories, the set of repositories is a subset of a plurality of repositories, each repository of the set of repositories represents a corresponding type of content of a plurality of types of content, each of the plurality of types of content is in a corresponding of a plurality of formats, the UI is configured to initiate the search using the one or more search terms by communicating the one or more search terms to a search index coupled to the set of repositories via a plurality of repository interfaces, and the search index is coupled to the each repository by a corresponding repository interface of a plurality of repository interfaces; and a second set of instructions, executable on a computer system, configured to receive a plurality of individual search results from the set of repositories at a set of the plurality of repository interfaces, wherein the plurality of individual search results comprise the plurality of types of content, and a third set of instructions, executable on the computer system, configured to display, on a display device, search results corresponding to the search, wherein the search is performed on the set of repositories, and the search results are configured to be displayed in a combined format; and a computer-readable storage medium, wherein the plurality of instructions are encoded in the computer-readable storage medium.

30. The computer program product of claim 29, wherein the plurality of instructions further comprises:

a fourth set of instructions, executable on the computer system, configured to select the set of repositories, in response to the search request, wherein the plurality of repositories are configured to be specified by an administrator, the revised set of repositories is configured to be used to revise the search, the revised repository request is configured to return revised search results, and the revised search results correspond to the revised set of repositories.

* * * * *

UNITED STATES PATENT AND TRADEMARK OFFICE
CERTIFICATE OF CORRECTION

PATENT NO. : 8,706,717 B2
APPLICATION NO. : 12/618351
DATED : April 22, 2014
INVENTOR(S) : Rajasekhar Page 1 of 1

It is certified that error appears in the above-identified patent and that said Letters Patent is hereby corrected as shown below:

On title page 2, column 1, under Other Publications, line 11, delete "hetrogenous" and insert -- heterogeneous --, therefor.

In the Specification

In column 5, line 3, delete "Fore" and insert -- For --, therefor.

In column 6, line 18, delete "though" and insert -- through --, therefor.

In column 6, line 26, delete "though" and insert -- through --, therefor.

In column 7, line 25, delete "interne" and insert -- internet --, therefor.

Signed and Sealed this
Second Day of September, 2014

Michelle K. Lee
*Deputy Director of the United States Patent and Trademark Office*